United States Patent

Kunugi

[11] Patent Number: 5,880,716
[45] Date of Patent: Mar. 9, 1999

[54] MONITOR CONTROL APPARATUS

[75] Inventor: Satoshi Kunugi, Tokyo, Japan

[73] Assignee: Kabushiki Kaisha Toshiba, Kawasaki, Japan

[21] Appl. No.: 788,694

[22] Filed: Jan. 24, 1997

[30] Foreign Application Priority Data

Jan. 26, 1996 [JP] Japan ................................. 8-011935

[51] Int. Cl.$^6$ ...................................................... G09G 5/00
[52] U.S. Cl. .......................... 345/173; 345/326; 364/146; 348/552
[58] Field of Search ..................................... 345/173, 326, 345/331, 335; 364/146; 348/552

[56] References Cited

U.S. PATENT DOCUMENTS

| 5,325,287 | 6/1994 | Spahr et al. ............................. 34/146 |
| 5,576,946 | 11/1996 | Bender et al. ......................... 364/146 |
| 5,659,624 | 8/1997 | Fazzari et al. ......................... 382/110 |

FOREIGN PATENT DOCUMENTS

| 2302419 | 1/1997 | United Kingdom . |
| WO 93/0855 | 4/1993 | WIPO . |

Primary Examiner—Jeffrey A. Hofsass
Assistant Examiner—Julie B. Lieu
Attorney, Agent, or Firm—Oblon, Spivak, McClelland, Maier & Neustadt, P. C.

[57] ABSTRACT

An operator designates an image of equipment or a device using a pointing device and touch coordinate detector which detects touch coordinates of the designated equipment or device on a graphic screen. A specifier compares the display coordinates on the image of each equipment or device sent from a display coordinate detector to the touch coordinates on the graphic screen output from the touch coordinate detector and outputs data specifying the equipment or device touched by the operator to a camera switching section. The camera switching section switches from a plant equipment and device monitor camera to an operating board monitor camera. The image of the operating board is displayed in a window in a predetermined area on the graphic screen. A CRT display controller causes an operating window to be displayed for the specified equipment or device displayed in a window on the CRT display unit. The operator manipulates the plant equipment and devices on the operating window corresponding to the operating board displayed on the display unit. Data indicating any specific operation is sent to a controller through an output data transmitter together with data representing the equipment or device specified by the pointing device to thereby control the specified equipment or device.

10 Claims, 5 Drawing Sheets

F I G. 1
(PRIOR ART)

| EQUIPMENT OR DEVICE | NO. 1 PUMP | NO. 2 PUMP | |
|---|---|---|---|
| OPERATING CONDITION | 1 | 0 | |
| SYMBOL DATA | ××× | ××× | |
| COORDINATE DATA OF SYMBOL | ××× | ××× | |

| EQUIPMENT OR DEVICE | NO. 1 PUMP | NO. 2 PUMP | |
|---|---|---|---|
| OPERATING CONDITION | 1 | 0 | |
| SYMBOL DATA | ××× | ××× | |
| COORDINATE DATA OF SYMBOL | ××× | ××× | |

MONITOR CONTROL APPARATUS

BACKGROUND OF THE INVENTION

The present invention relates to a monitor control apparatus for monitoring the normal operation and fault conditions of the equipments and devices of water and sewage plants, building and factory equipments, and various production plants.

Generally, in a monitor control apparatus for monitoring the normal operation and fault conditions of plant equipments and devices, the normal operation and fault conditions of the plant equipments and devices including pumps and motors are monitored and controlled by displaying a graphic screen and the images of the equipments and devices of the plant on a CRT display unit.

The graphic screen is defined as a screen on which the plant equipments and devices are modeled and displayed in symbols, and the operation and fault conditions of a given plant equipments or devices are indicated by changing the color of or flickering the symbol of the particular equipment or device.

Figure 1:
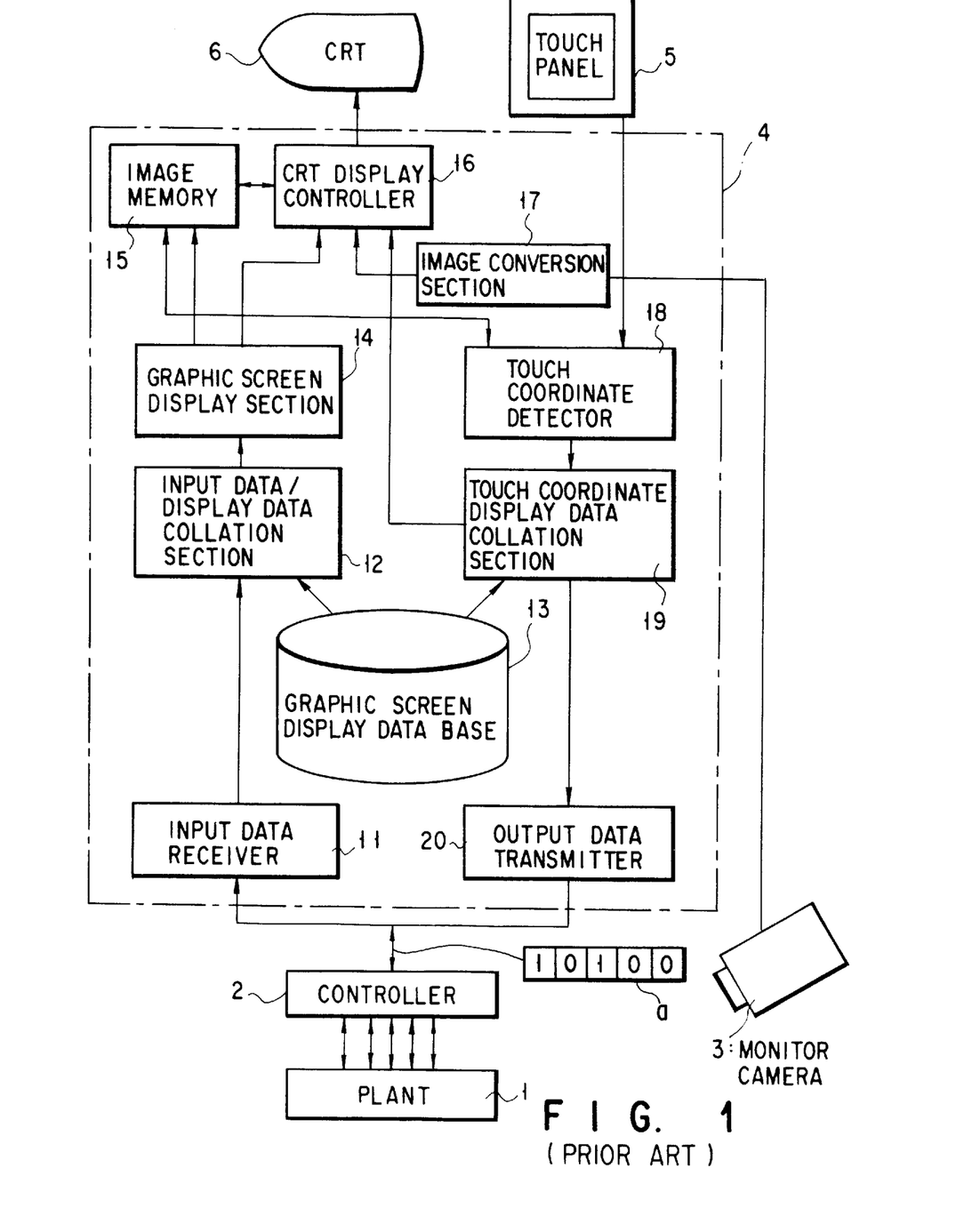
FIG. 1 is a block diagram showing a configuration of a conventional monitor control apparatus.

FIG. 1 is a diagram showing a configuration of a conventional monitor control apparatus.

This monitor control apparatus comprises a controller 2, a monitor camera 3, a data processing unit 4 and a CRT display unit 6.

The controller 2 retrieves operating condition signals indicating the operating conditions of a plurality of equipments and devices including pumps and valves of the plant 1, and outputs by converting them into the operating condition data a in the state of "1" for normal or "0" for a fault, for example. Also, the controller 2 retrieves a control signal from a host system and thereby operates the equipments and devices of the plant 1.

The monitor camera 3 takes an image of each equipment or device of the plant 1.

The data processing unit 4 retrieves and processes the operating condition data a as required of each equipment or device of the plant 1, and thus supplies the control data required for the controller 2.

The CRT display unit 6 includes a pointing device 5 such as a touch panel or a mouse.

The data processing unit 4 displays the graphic image of the plant over the entire screen of the CRT display unit 6, and has the function of displaying the image of each equipment or device of the plant 1 supplied from the monitor camera 3 in a window in a predetermined area on the graphic screen.

Now, the operation of this monitor control apparatus will be explained.

An input data receiver 11 is for receiving the operating condition data a sent from each equipment or device of the plant 1 through the controller 2 and sends the operating condition data a to an input data/display collation section 12.

Figure 2:
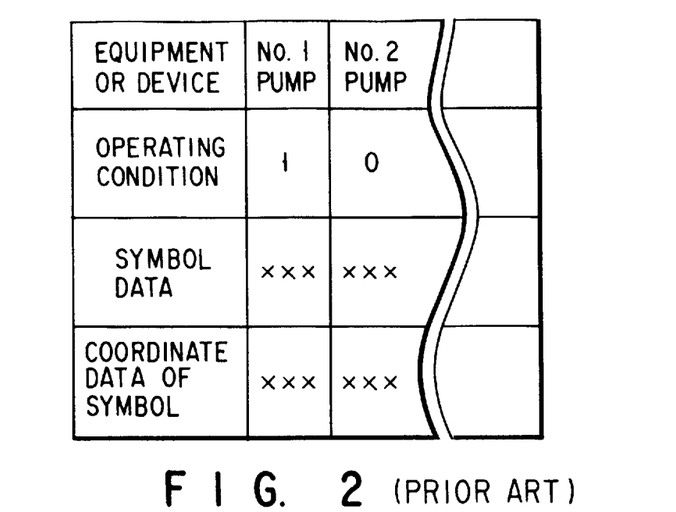
FIG. 2 is a diagram for explaining the graphic screen display data stored in the graphic screen display data base.

The input data/display collation section 12 retrieves the operating condition data a sent from the input data receiver 11, and collates the operating condition data a with the graphic screen display data such as shown in FIG. 2 stored in the graphic screen display data base 13. On the basis of the result of this collation, an equipment or device (a pump, a valve, etc.) of the plant 1 is specified and the operating condition of the specified equipment or device is discriminated. The result of this discrimination of the operating condition together with the symbol data and the symbol coordinate data of the equipment or device shown in FIG. 2 is sent to the graphic screen display section 14.

On the basis of the symbol data and the symbol coordinate data sent from the input data/display collation section 12, the graphic screen display section 14 changes the display condition of the symbols of the equipment or device of the plant 1 appearing on the graphic screen and stores them in an image memory 15. The CRT display controller 16 is for reading the graphic screen stored in the image memory 15 and displaying it on the CRT display unit 6.

The image of each equipment or device of the plant 1 taken by the monitor camera 3, on the other hand, is converted into an image data at an image conversion means 17, sent to the CRT display controller 16, stored in a predetermined area of the image memory 15 in accordance with a window display program, and displayed similarly in a window on the CRT display unit 6.

Then, on the basis of the result of monitoring on the graphic screen, the following operation is performed using the pointing device 5 such as a touch panel.

Specifically, the operator designates a symbol of an appropriate plant equipment or device on the graphic screen of the CRT display unit by the pointing device 5. Then, a touch coordinate detector 18 detects the coordinate of the designated portion on the graphic screen and sends out the coordinate to a touch coordinate/display data collation section 19.

Figure 3:
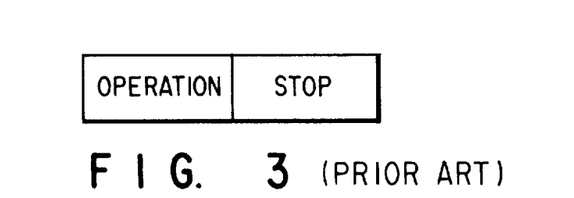
FIG. 3 is a diagram showing icons displayed on the graphic screen.

The touch coordinate/display data collation section 19 collates the designated coordinate data on the graphic screen with the graphic screen display data stored in the data base 13, and on the basis of this collation, specifies an equipment or device. At the same time, the touch coordinate/display data collation section 19 controls the CRT display controller 16 thereby to display operation and stop icons shown in FIG. 3 or the like icons stored in the image memory 15 on the graphic screen of the CRT display unit 6.

Upon designation of any one of the icons by the operator, the content of operation selected for the specified equipment or device is sent out to the controller 2 through an output data transmitter 20. As a result, the related plant device is controlled by the controller 2.

Since the graphic screen of the CRT display unit 6 displays each equipment or device of the plant 1 in a simplified form, however, the operator is required to operate the system while watching the image of the monitor camera 3.

After determining which equipment or device of the plant displayed as an image corresponds to which symbol on the graphic screen, the symbol displayed on the graphic screen is required to be manipulated.

Also, the change in the operating condition from a fault to the normal state of each equipment or device of the plant 1 as a result of monitoring operation is required to be ascertained on the graphic screen or the image of the plant. With the increase in the scale of the plant and the number of equipments and devices to be monitored, therefore, the problem has been posed that an increased burden is imposed on the operator monitoring the plant.

Specifically, in the above-mentioned the monitor control apparatus, the image and the graphic screen are displayed separately, and the monitoring by image and the manipulation by the graphic screen are carried out separately from each other. Even in the case where a fault is found by the operator on the image, therefore, comparison with the symbols on the graphic screen takes considerable time, thereby making it impossible to quickly accommodate the fault of the plant equipment or device 1. Also, the possibility of erroneous operation of the equipments and devices of the plant 1 is liable to occur due to the error in comparison between each equipment or device of the plant 1 and the corresponding symbol on the graphic screen.

BRIEF SUMMARY OF THE INVENTION

The prevent invention has been developed in view of the above-mentioned situation, and the object thereof is to provide a monitor control apparatus capable of accommodating a fault of a plant device quickly without consuming long time for comparing the graphic screen and the images.

According to a first aspect of the invention, there is provided a monitor control apparatus comprising first imaging means for taking an image of a plurality of plant equipment and devices, equipment and device display means for displaying the image of the equipment and devices imaged by said first imaging means on at least a part of graphic screen displaying symbols of the equipment and devices of said plant, pointing means for designating the image of the equipment and devices displayed by said equipment and device display means, graphic coordinate detection means for detecting the first data representing coordinate on the graphic screen of the image of the equipment or device designated by said pointing means, image coordinate detection means for detecting second data indicating coordinate of the image of the equipment and devices of the plant taken by said first imaging means, and equipment and device specifying means for specifying a equipment or device on the graphic screen designated by said pointing means on the basis of the first data detected by said graphic coordinate detection means and the second data detected by said image coordinate detection means.

According to a second aspect of the invention, there is provided a monitor control apparatus of the first aspect in which the pointing means is a touch panel.

According to a third aspect of the invention, there is provided a monitor control apparatus of the first aspect in which the image coordinate detection means includes first storage means for storing pattern data required for recognizing the image of the equipment and devices taken by the first image-taking means, pattern data recognition means for recognizing the pattern data stored in the first storage means from the image of the equipments and devices taken by the first image-taking means, second storage means for storing second data indicating the coordinate of the image corresponding to the pattern data stored in the first storage means, and first detection means for detecting the second data indicating the coordinate of the image stored in the second storage means corresponding to the pattern data recognized by the pattern data recognition means.

According to a fourth aspect of the invention, there is provided a monitor control apparatus of the first aspect, in which the equipment and device display means displays the image of the equipment and devices taken by the first image-taking means in a window on the graphic screen.

According to a fifth aspect of the invention, there is provided a monitor control apparatus of the first aspect, further comprising second image-taking means for taking an image of the operating board for operating the equipment and devices, an operating board display means for displaying the image of the operating board taken by the second image-taking means on at least a part of the graphic screen, switching means for causing the image of the operating board displayed by the operating board display means to be displayed on the graphic screen in place of the image of the equipment or device displayed by the equipment and device display means in the case where an equipment or device on the graphic screen is specified by the equipment and device specifying means, an operating icon display means for displaying on the graphic screen a plurality of operating icons corresponding to the operating board displayed on the operating board display means in the case where the image of the operating board is caused to be displayed on the graphic screen by the switching means, icon designation means for designating an operating icon displayed on the operating icon display means, and control means for controlling the equipment or device specified by the equipment and device specifying means on the basis of the designation of the operating icon by the icon designation means.

According to a sixth aspect of the invention, there is provided a monitor control apparatus comprising an image-taking means for taking an image of the equipment and devices of a plant, operating condition data acquisition means for acquiring the operating condition data indicating the operating conditions of the equipment and devices in a predetermined sequence, an equipment and device coordinate detection means for detecting the first data indicating the coordinate of the image of an equipment or device taken by the image-taking means, a first storage means for storing the relation between the operating condition data of an equipment or device and the particular equipment or device, a specifying means for specifying an equipment or device corresponding to the operating condition data acquired by the operating condition data acquisition means on the basis of the relation between the operating condition data stored in the first storage means and the particular equipment or device, a correlating means for correlating the equipment or device specified by the specifying means, the operating condition data and the first data detected by the equipment and device coordinate detection means, a second storage means for storing the symbol data of the equipment and devices, a first display means for displaying the image of the equipment or device taken by the image-taking means, and a second display means for displaying the symbol data stored in the second storage means in superposed relation with the equipment or device displayed on the first display means on the basis of the relation between the second data correlated by the correlating means, the operating condition data and the first data.

According to a seventh aspect of the invention, there is provided a monitor control apparatus of the sixth aspect, in which the equipment and device coordinate detection means includes a third storage means for storing the pattern data required for recognizing the images of the equipment and devices taken by the image-taking means, a pattern data recognition means for recognizing the pattern data stored in the third storage means from the images of the equipment and devices taken by the image-taking means, a fourth storage means for storing the third data indicating the coordinates of the images corresponding to the pattern data stored in the third storage means, and a detection means for detecting the first data indicating the coordinate of each image stored in the fourth storage means corresponding to the pattern data recognized by the pattern data recognition means.

In the monitor control apparatus of the first aspect, upon designation of the image of an equipment or device by the pointing means, the equipment or device on the graphic screen corresponding to the designated image of the equipment or device can be specified by the image the equipment and device specifying means. The plant can therefore be monitored and controlled quickly without comparing the image screen to the graphic screen.

In the monitor control apparatus of the fifth aspect, in the case where the image of the operating board is displayed on the graphic screen by the switching means, the operating icons corresponding to the operating board displayed on the operating board display means are displayed on the graphic screen by the operating icon display means. Then, the icon designation means designates an appropriate operating icon displayed on the operating icon display means. On the basis of the designation of the operating icon by the icon designation means, the control means controls the equipment or device specified by the equipment and device specifying means. The equipment or device specified can thus be monitored and controlled accurately.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Embodiments of the invention will be described below with reference to the drawings.

First Embodiment

Figure 4:
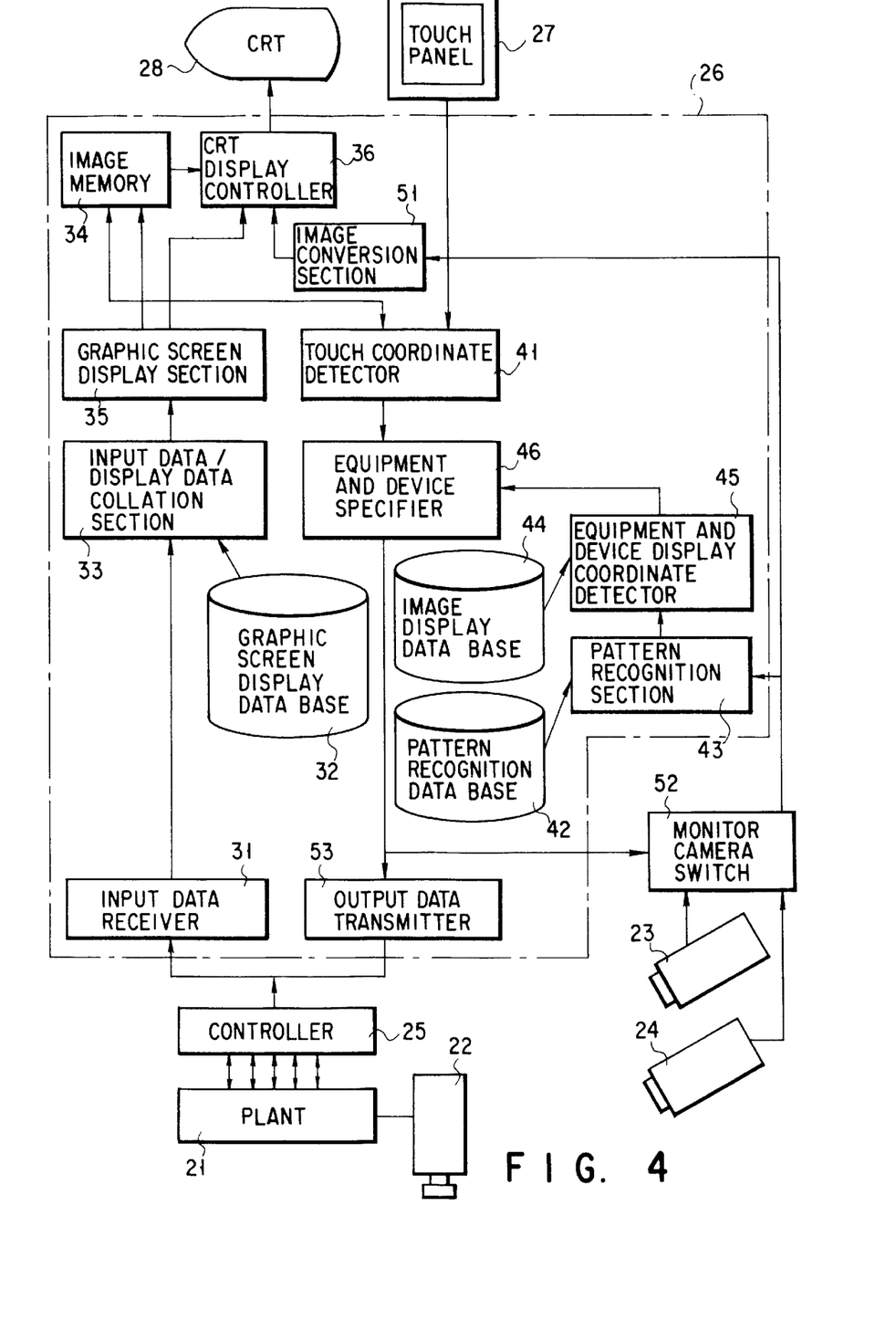
FIG. 4 is a block diagram showing a configuration of a monitor control apparatus according to a first embodiment of the invention.

FIG. 4 is a block diagram showing a configuration of a monitor control apparatus according to a first embodiment of the invention.

As shown in FIG. 4, a field operating board 22, a plant equipment and device monitor camera 23, an operating board monitor camera 24 and a controller 25 are arranged in the field installed with a plant 21 including a plurality of equipments and devices such as pumps and valves.

The field operating board 22 is for operating and manipulating the equipments and devices such as pumps and valves of the plant 21.

The plant equipment and device monitor camera 23 is for taking an image of each equipment or device of the plant 21. At least one camera 23 is installed.

The operating board monitor camera 24 monitors the operating board for operating each equipment or device of the plant 21.

The controller 25 retrieves the operating condition of each of the equipments and devices such as pumps and valves of the plant 21, and outputs by converting the operating condition of each equipment and device of the plant 21 into the operating condition data in a predetermined order of equipments and devices. In the case where an equipment or a device such as a pumps or a valve is operating normally, for example, the operating condition data is given in state "1", whereas the operating condition data "0" is output in case of a fault of the equipment or device.

Also, the controller 25 retrieves a control signal sent from a host system and operates the equipments and devices such as the pumps and valves in the plant 21.

A data processing unit 26 having the monitor and control function and a CRT display unit 28 including a pointing device 27 such as a touch panel or a mouse are arranged at a predetermined location distant from the field.

The data processing unit 26 includes a graphic screen display system, an equipment and device specifying system and an equipment and device operating system used after specifying the equipments and devices.

The graphic screen display system includes an input data receiver 31, a data base 32, an input data/display collation section 33, an image memory 34, a graphic screen display section 35 and a CRT display controller 36.

The input data receiver 31 receives the operating condition data representing the normal operating condition, the fault condition and other operating conditions transmitted from the equipments and devices such as pumps and valves through the controller 25 in a predetermined order of equipments and devices.

Figure 5:
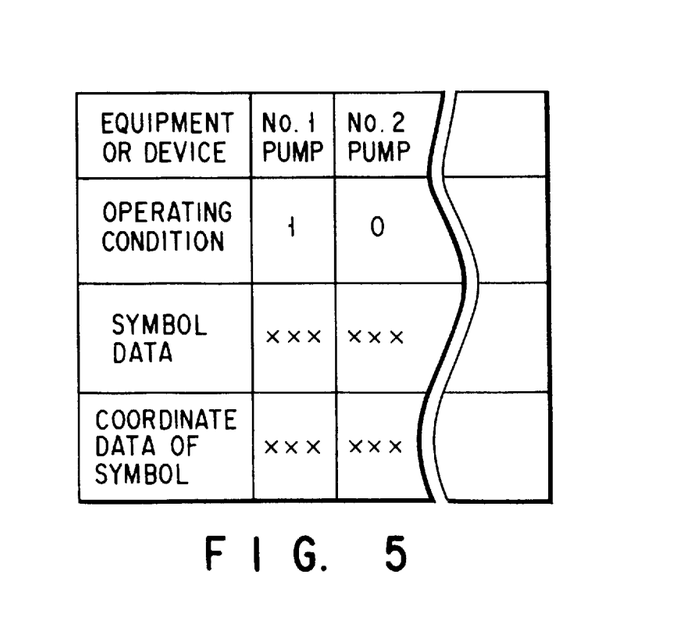
FIG. 5 is a diagram showing the data stored in the graphic screen display data base.

The data base 32, as shown in FIG. 5, stores the data such as the operating conditions, the symbol data and the symbol coordinate data required for displaying the graphic screen.

The input/data display data collation section 33 updates the operating condition area of the data base 32 shown in FIG. 5 on the basis of the operating condition data sent from the input data receiver 31. The collation section 33 also discriminates the operating condition of each equipment or device on the basis of the operating condition data.

Further, the input data/display collation section 33 retrieves the data such as the symbol data and the symbol coordinate data of each equipment or device required for displaying the graphic screen from the graphic screen display data base 32.

The graphic screen display section 35 retrieves the data such as the symbol data and the symbol coordinate data of each equipment or device required for displaying the graphic screen retrieved from the graphic screen display data base by the input data/display collation section 33, and produces a graphic screen on the basis of the data thus retrieved. The graphic screen display section 35 stores the graphic screen thus produced in the image memory 34.

The CRT display controller 36 displays the graphic screen stored in the image memory 34 on the CRT display section 28.

The equipment and device specifying system includes a touch coordinate detector 41, a pattern recognition data base 42, a pattern recognition section 43, an image display data base 44, an equipment and device display coordinate detector 45 and an equipment and device specifier 46.

The touch coordinate detector 41 is for detecting the touch coordinate of an equipment or device such as a pump or a valve designated on the graphic screen by the pointing device 27 on the basis of the data representing the coordinate of the image of the equipment or device designated by the pointing device 27 and the graphic screen data stored in the image memory 34.

Figure 6:
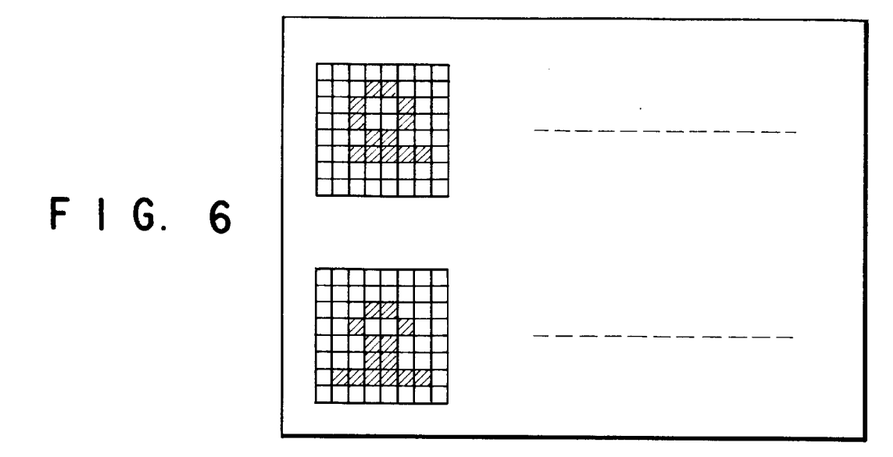
FIG. 6 is a diagram showing the pattern data stored in the pattern recognition data base.

The pattern recognition data base 42 stores a multiplicity of pattern data as shown in FIG. 6 required for identifying the images of the equipments and devices taken by the plant equipment and device monitor camera 23 in advance.

The pattern recognition section 43 recognizes the pattern of each equipment or device from the image of each equipment or device taken by the plant equipment and device monitor camera 23 and various identification patterns of the data base 42, and applies the pattern data of the pattern thus recognized to the equipment and device display coordinate detector 45.

The image display data base 44 stores the data required for detecting the coordinates of the images of the equipments and devices taken by the plant equipment and device monitor camera 23 in advance. These data include the pattern data and the corresponding image coordinate data for example.

The equipment and device display coordinate detector 45 detects the coordinate data on the image of each equipment or device from each pattern data sent from the pattern recognition section 43 and the image coordinate data corresponding to each pattern stored in the data base 44, and applies the image coordinate data of each equipment or device to the equipment and device specifier 46

The equipment and device specifier 46 specifies the equipment or device designated by the pointing device 27 on the basis of the image coordinate of the equipment or device output from the equipment and device display coordinate detector 45 and the touch coordinate on the graphic screen output from the touch coordinate detector 41, and outputs the specified equipment or device data representing the equipment or device thus specified.

The equipment and device operating system includes a monitor camera switching section 52 and an output data transmitter 53. This equipment and device operating system is used after a device is specified by the equipment and device specifying system.

The monitor camera switching section 52 switches the operation from the plant equipment and device monitor camera 23 to the field operating board monitor camera 24 for taking an image of a specified equipment or device on the basis of the specified equipment or device data sent from the equipment and device specifier 46. As a result, the image of the field operating board 22 is coordinate-converted by the coordinate converter 51 and displayed in a window on the graphic screen of the CRT display unit 28.

Figure 7:
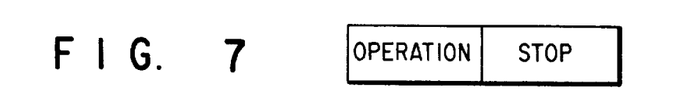
FIG. 7 is a diagram showing operating icons displayed on the CRT display unit.

Upon manipulation of the operating icons as shown in FIG. 7 displayed on the CRT display unit 28 by the operator, the output data transmitter 53 retrieved the contents of the manipulation and sends the contents of manipulation and the specified equipment or device data indicating the equipment or device designated by the pointing device 27 to the controller 25.

The operating icons are displayed on the operating section or other area of the field operating board displayed in a window on the CRT display unit by the CRT display controller 36 on the basis of the data of the operating icons corresponding to each equipment or device stored in the image memory 34 when the image of the field operating board of the equipment or device designated by the pointing device 27 is displayed in a window on the graphic screen of the CRT display unit 28 after the operation is switched from the plant equipment and device monitor camera 23 to the operating board monitor camera 24 for monitoring the field operating board for operating the specified equipment or device by the monitor camera switching section 52.

Now, the operation of this monitor control apparatus will be explained.

The input data receiver 31 sequentially receives the operating condition data of the pumps and valves included in the equipments and devices 21 in a predetermined order transmitted from the equipment and devices such as the pumps and valves through the controller 25, and sends them out to the input data/display collation section 33.

The input data/display collation section 33 collates the operating condition data of the pumps and valves included in the equipments and devices 21 received from the input data receiver 31 with the graphic screen display data stored in the data base 32, and discriminates the pumps and valves of the plant 21 corresponding to the operating condition data received and the operating conditions of the particular equipments and devices.

Also, the input data/display collation section 33 retrieves the symbol data, the symbol coordinate data and other data on each equipment or device required for displaying the graphic screen into the graphic screen display data base 32.

The input data/display collation section 33 also sends the operating condition data indicating the operating conditions of given ones of the equipment and devices 21 including pumps and valves to the graphic screen display section 35 together with graphic screen display data required for displaying the graphic screen. At the same time, the operating condition data of the data base 32 are updated on the basis of the current operating conditions.

The graphic screen display section 35 produces a graphic screen using the operating condition data for each one of the equipments and devices 21 specified by the input data/display collation section 33 and the graphic screen display data, and stores them in the image memory 34.

In the process, the graphic screen display section 35 stores in the image memory 34 the data for changing the color of the symbol of each corresponding equipment or device of the plant 21 on the image memory 34 or for flickering such a symbol with a predetermined period on the basis of the equipment or device of the plant 21 and the operating condition data of the equipment or device discriminated by the input data/display collation section 33. The graphic screen stored in the image memory 34 is thus displayed on the CRT display unit 28.

The image of each equipment or device included in the equipment and devices 21 taken by the plant equipment and device monitor camera 23, after being converted in coordinate through the monitor camera switching section 52, is displayed in a window on the graphic screen of the CRT display unit 28 by the CRT display controller 36.

Under this condition, the operator designates the image of an equipment or device displayed in a window on the graphic screen of the CRT display unit 28 by the pointing device 27. Then, the touch coordinate detector 41 detects the touch coordinate on the graphic screen.

When the image of each equipment or device of the field plant 21 is retrieved and sent to the CRT display controller 36 by the plant equipment and device monitor camera 23, the pattern recognition section 43 sequentially identifies the images of the equipments and devices displayed on the camera 23 on the basis of the identification patterns of the pattern recognition data base 42. The pattern data thus identified are sent out to the equipment and device display coordinate detector 45.

The plant equipment and device display coordinate detector 45 collates the identification pattern sent out from the pattern recognition section 42 with the data stored in the image display data base 44, detects the display coordinate of the image of each equipment or device, and sends out the image coordinate data of each device to the equipment and device specifier 46.

The equipment and device specifier 46 collates the display coordinate of the image of each equipment or device sent from the equipment and device display coordinate detector 45 with the touch coordinate on the graphic screen output from the touch coordinate detector 41, specifies the plant equipment or device touched by the operator, and stores the specified equipment or device data indicating the specified equipment or device in a memory (not shown) while at the same time sending out the same data to the camera switching section 52.

The camera switching section 52 switches the operation from the plant equipment and device monitor camera 23 to the operating board monitor camera 24 for monitoring the field operating board to manipulate a specified equipment or device on the basis of the specified equipment or device data output from the equipment and device specifier 46.

As a result, the operating board monitor camera 24 converts the coordinate of the image of the field operating board in such a manner as to be displayed in a window in a predetermined area on the graphic screen through the coordinate conversion section 51, and then the coordinate-converted image is output to the CRT display section 36.

The coordinate-converted image of the field operating board is displayed in a window in a predetermined area on the graphic screen by means of the CRT display controller 36.

The operator manipulates the plant equipment and devices in the operating window corresponding to the field operating board displayed on the display unit 27. The data indicating the particular operation are sent to the controller 25 through the output data transmitter 53 together with the data indicating the equipment or device specified by the pointing device 27.

The controller 25 controls the specified equipment or device on the basis of the specified equipment or device data and the data indicating the contents of operation sent out from the output data transmitter 53.

In the foregoing description, the image taken by the plant equipment and device monitor camera 23 is assumed to be displayed in a window on the CRT display unit 28. The image, however, may be displayed over the whole screen instead of in a window.

As a result, in the monitor control apparatus according to this embodiment, the pattern recognition section 43 and the display coordinate detector 45 detect the display coordinate of the image of each equipment or device taken by the monitor camera 23, and the equipment or device located at the coordinate designated by the pointing device 27 is specified with reference to the display coordinate of the image of each equipment or device. Therefore, the operator is not required to compare the symbol of the equipment or device on the graphic screen to the image on the monitor camera, and it is possible to automatically specify the equipment or device designated by the pointing device.

Also, after specifying the equipment or device designated by the pointing device, the operation is switched from the equipment and device monitor camera 23 to the operating board monitor camera 24, the image of the operating board is displayed in a window on the graphic screen, and the equipment and devices are operated using the operating icons corresponding to the operating board displayed in a window. Thus the operator can accurately operate the equipment and devices in the same manner as if directly operating actual equipment and devices while at the same time checking the plant conditions.

Second Embodiment

Figure 8:
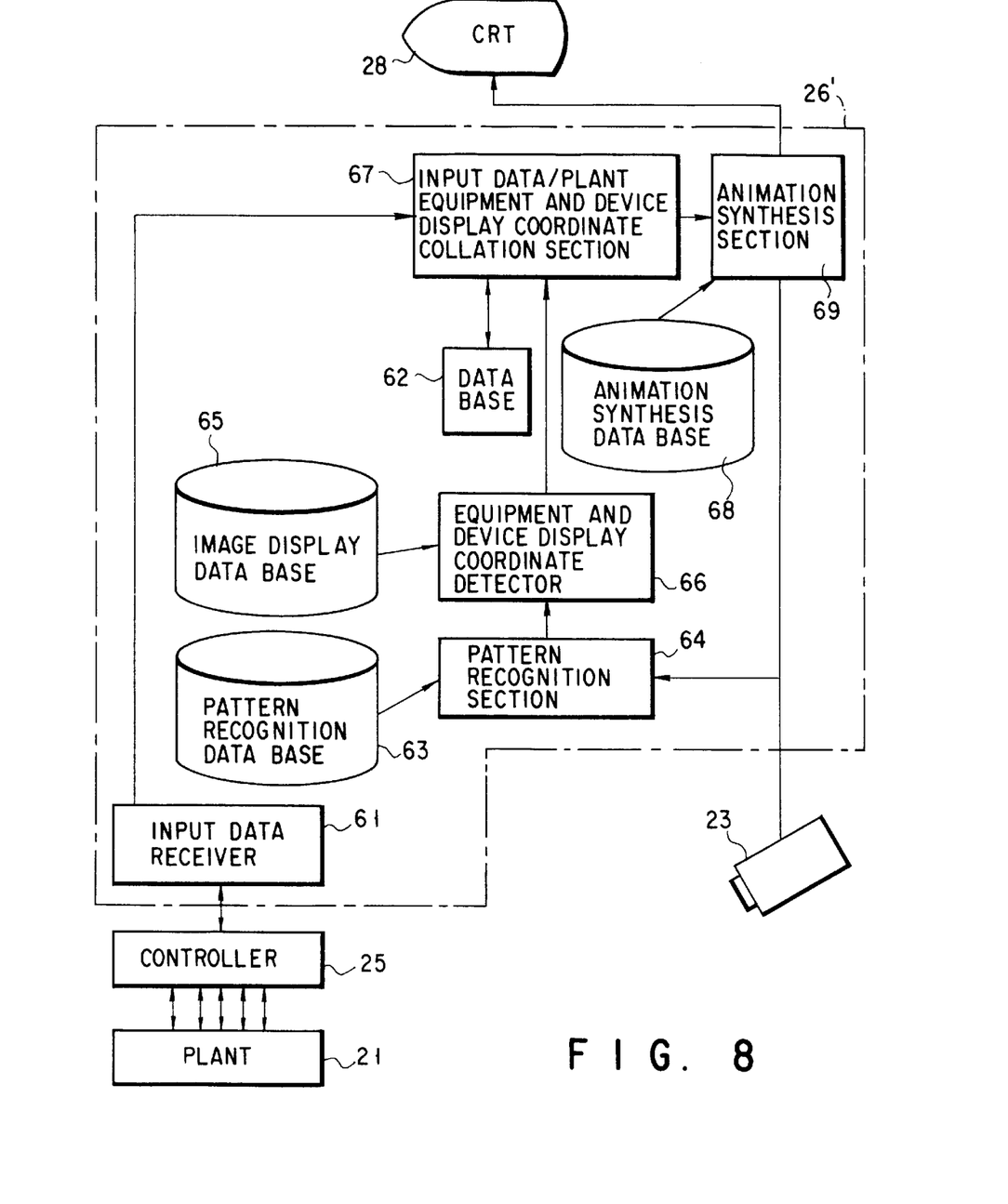
FIG. 8 is a block diagram showing a configuration of a monitor control apparatus according to a second embodiment of the invention.

FIG. 8 is a block diagram showing a configuration of a monitor control apparatus according to a second embodiment of the invention.

In the monitor control apparatus according to this embodiment, the image of arbitrary ones of the equipment and devices 21 including pumps and valves of the field plant taken by the monitor camera 23 is displayed over the whole screen of the CRT display unit 28. The operating conditions of arbitrary ones of the equipment and devices 21 are superposed (by animation synthesis) on the image of the CRT display unit 28 by means of the data processing unit 26'.

As shown in FIG. 8, the monitor control apparatus according to this embodiment comprises an input data receiver 61, a data base 62, a pattern recognition data base 63, a pattern recognition section 64, an image display data base 65, an equipment and device display coordinate detector 66, an input data/plant equipment and device display coordinate collation section 67, an animation synthesis data base 68 and an animation synthesis section 69.

The input data receiver 61 receives the operating condition data of each one of the equipment and devices 21 in a predetermined sequence sent from the controller 25, and sends out the operating condition data thus received to the input data/equipment and device display coordinate collation section 67.

The data base 62 stores the operating conditions of each one of the equipment and devices 21 in a predetermined sequence and the coordinate data of the symbol of each equipment or device.

The pattern recognition data base 63 stores a multiplicity of pattern data as shown in FIG. 6 required for identifying the image of the equipment or device taken by the plant equipment and device monitor camera 23 in advance.

The pattern recognition section 64 recognizes the pattern of each equipment or device from the image thereof taken by the monitor camera 23 and the various identification patterns stored in the data base 63.

The image display data base 65 stores data required for coordinate detection of the image of the equipment or device taken by the plant equipment and device monitor camera 23 in advance. These data include the patterns and the coordinate data for each pattern, for example.

The equipment and device display coordinate detector 66 detects and outputs the coordinate data of the image of each equipment or device on the basis of each pattern recognized by the pattern recognition section 64 and the coordinate data stored in the data base 65.

The input data/plant equipment and device display coordinate collation section 67 collates the operating condition data of each one of the equipment and devices 21 sent from the input data receiver 61 with the data stored in the data base 62, and determines which equipment or device located at which place (coordinate) is in what operating condition. The data representing each equipment or device and the operating conditions thereof are related to the coordinate of the image of each equipment or device displayed by the monitor camera 23 output from the equipment and device display coordinate detector 66.

Figure 9:
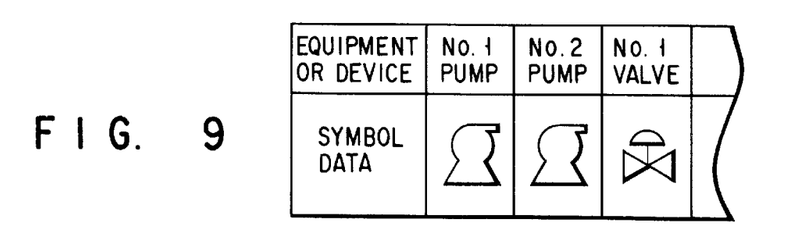
FIG. 9 is a diagram showing the data stored in the animation synthesis data base.

The animation synthesis data base 68 stores the names of the equipment and devices, the symbol data of the particular equipment and devices and other required data as shown in FIG. 9.

The animation synthesis section 69 synthesizes (by animation synthesis) the symbols and the operating conditions of each equipment and device over the image of the particular equipment and device taken by the monitor camera 23 using the data correlated by the input data/plant equipment and device display coordinate collation section 67 and the data stored in the data base 68, and displays the synthesized image on the CRT display unit 28.

Now, the operation of the monitor control apparatus configured as mentioned above will be explained.

The input data receiver 61 receives the operating condition data of the equipment and devices in a predetermined sequence from the controller 25, and outputs the operating condition data thus received to the input data/plant equipment and device display coordinate collation section 67.

On the other than, the image of each one of the equipment and devices 21 taken by the monitor camera 23 is sent out to the animation synthesis section 69 and displayed on the CRT display unit 28. In the process, the pattern recognition section 64 collates the image of each one of the equipment and devices 21 taken by the monitor camera 23 with a multiplicity of identification patterns of the equipment and devices stored in the pattern recognition data base 63, specifies the identification pattern of each one of the images of the equipment and devices 21 taken by the monitor camera 23, and sends out the specified pattern data to the equipment and device display coordinate detector 66.

The equipment and device display coordinate detector 66 specifies the image of the coordinate data of each equipment or device taken by the monitor camera 23 using the coordinate identification data stored in the image display data base 65 and the identification pattern recognized by the pattern recognition section 64, and sends out the coordinate data thus specified to the input/data plant equipment and device display coordinate collation section 67.

In the input data/equipment and device display coordinate collation section 67, the operating condition data of each equipment or device sent from the input data receiver 61 are compared to the data in the data base 62, thereby determining which equipment or device at which location (coordinate) is in what operating condition. In other words, each equipment or device corresponding to the operating condition data is specified while at the same time recognizing the operating condition of each equipment or device specified.

Each equipment or device thus specified is related to the operating condition data representing the operating condition of the particular equipment or device and the coordinate of the image of each equipment or device taken by the monitor camera 23 output from the equipment and device display coordinate detector 66.

The animation synthesis section 69 synthesizes (by animation synthesis) the symbol and the operating conditions on the image of each equipment or device taken by the monitor camera 23 using the data related by the input data/plant equipment and device display coordinate collation section 67 and the data stored in the data base 68, and displays the synthesized data on the CRT display unit 28.

Figure 10:
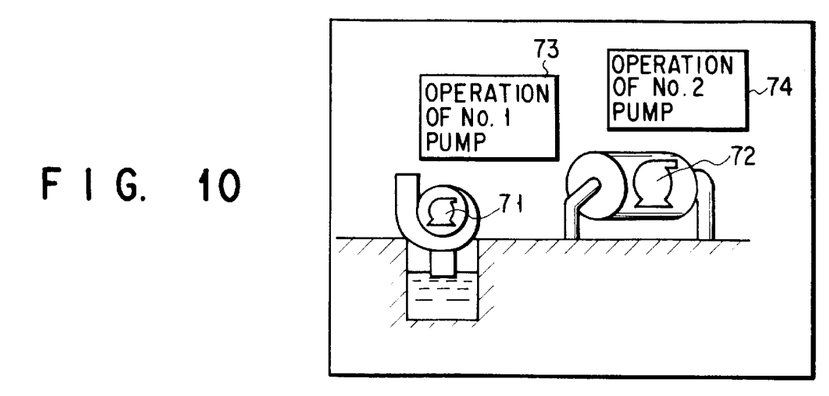
FIG. 10 is a diagram showing a monitor screen displayed on the CRT display unit.

FIG. 10 is a diagram showing the monitor screen displayed on the CRT display unit 28.

As shown in FIG. 10, symbols 71, 72 are displayed of each equipment or device on the screen image taken by the monitor camera 23. Also, the operating conditions 73, 74 of each equipment or device are displayed for the particular equipment or device.

As described above, in the monitor control apparatus according to this embodiment, the symbols and the operating conditions are displayed in superposed relation on the image of the equipment and devices including pumps and valves taken by the monitor camera, and therefore the symbols and operating conditions can be displayed in correspondence with the images of the equipment and devices, thereby facilitating the monitoring of the operating conditions of the equipment and devices.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

I claim:

1. A monitor control apparatus comprising:

first imaging means for taking an image of equipment and devices of a plant;

equipment and device display means for displaying the image of the equipment and devices imaged by said first imaging means on at least a part of a graphic screen displaying symbols of the equipment and devices of said plant;

pointing means for designating an equipment and device on the image displayed by said equipment and device display means;

graphic coordinate detection means for detecting first data representing first coordinates on the graphic screen, the first coordinates corresponding to second coordinates representing the equipment and device on the image designated by said pointing means;

image coordinate detection means for detecting second data indicating coordinates of the equipment and devices on the image taken by said first imaging means; and

13 equipment and device specifying means for specifying at least one of the equipment and devices on the graphic screen which corresponds to the equipment and devices on the image designated by said pointing means, said specifying being on the basis of the first data detected by said graphic coordinate detection means and the second data detected by said image coordinate detecting means.

2. The monitor control apparatus according to claim 1, wherein said pointing means is a touch panel.

3. The monitor control apparatus according to claim 1, wherein said image coordinate detection means comprises:

first storage means for storing pattern data required for recognizing the image of the equipment and devices taken by said first imaging means;

pattern data recognition means for recognizing the pattern data stored in said first storage means from the image of said equipment and devices taken by said first imaging means;

second storage means for storing the second data representing the coordinates on the image corresponding to the pattern data stored in the first storage means; and first detection means for detecting the second data representing the coordinates an the image stored in said second storage means, the second data corresponding to the pattern data recognized by said pattern data recognition means.

4. The monitor control apparatus according to claim 1, wherein said equipment and device display means displays the image of the equipment and devices taken by said first imaging means in a window on the graphic screen.

5. A monitor control apparatus comprising:

first imaging means for taking an image of equipment and devices of plant;

equipment and device display means for displaying the image of the equipment and devices imaged by said first imaging means on at least a part of a graphic screen displaying symbols of the equipment and devices of said plant;

pointing means for designating an equipment and device on the image displayed by said equipment and device display means;

graphic coordinate detection means for detecting first data representing first coordinates on the graphic screen, the first coordinates corresponding to second coordinates representing the equipment and device on the image designated by said pointing means;

image coordinate detection means for detecting second data indicating coordinates of the equipment and devices on the image taken by said first imaging means;

equipment and device specifying means for specifying at least one of the equipment and devices on the graphic screen which corresponds to the equipment and devices on the image designated by said pointing means, said specifying being on the basis of the first data detected by said graphic coordinate detection means and the second data detected by said image coordinate detection means;

second imaging means for taking an image of the operating board for operating said equipment and devices;

operating board display means for displaying the image of said operating board taken by said second imaging means in at least a part of the graphic screen;

switching means for displaying the image of the operating board on the graphic screen by said operating board

14 display means in place of the image of the equipment or device displayed by said equipment and device display means in the case where the at least one of the equipment and devices on said graphic screen is specified by said equipment and device specifying means;

operating icon display means for displaying on said graphic screen the operating icons corresponding to the operating board display means in the case where the image of said operating board is displayed on the graphic screen by said switching means;

icon designating means for designating an operating icon displayed by the operating icon display means; and control means for controlling the equipment or device specified by said equipment and device specifying means on the basis of the designation of said operating icons by said icon designation means.

6. The monitor control apparatus according to claim 5, wherein said pointing means is a touch panel.

7. The monitor control apparatus according to claim 5, wherein said image coordinate detection means comprises:

first storage means for storing pattern data required for recognizing the image of the equipment and devices taken by said first imaging means;

pattern data recognition means for recognizing the pattern data stored in said first storage means from the image of said equipment and devices taken by said first imaging means;

second storage means for storing the second data representing the coordinates of the image corresponding to the pattern data stored in the first storage means; and first detection means for detecting the second data representing the coordinates on the image stored in said second storage means, the second data corresponding to the pattern data recognized by said pattern data recognition means.

8. The monitor control apparatus according to claim 5, wherein said equipment and device display means displays the image of the equipment and devices taken by said first imaging means in a window on the graphic screen.

9. A monitor control apparatus comprising:

imaging means for taking an image of equipment and devices of a plant;

operating condition data acquisition means for acquiring operating condition data representing operating conditions of said equipment and devices in a predetermined sequence;

equipment and device coordinate detection means for detecting first data representing coordinates of the equipment and devices on the image taken by said imaging means;

first storage means for storing a relation between the operating condition data and the equipment and devices;

specifying means for specifying at least one of the equipment and devices corresponding to the operating condition data acquired by said operating condition data acquisition means on the basis of the relation stored in said first storage means;

relating means for relating the at least one of the equipment and devices specified by said specifying means to said operating condition data and the first data detected by said equipment and device coordinate detection means;

second storage means for storing symbol data representative of said equipment and devices;

first display means for displaying the image of the equipment and devices taken by said imaging means; and second display means for displaying the symbol data stored in said second storage means in superposed relation on said equipment and devices on the image displayed by said first display means on the basis of the relation stored in said first storage means, said operating condition data and said first data related to each other by said relating means.

10. The monitor control apparatus according to claim 9, wherein said equipment and device coordinate detection means comprises:

third storage means for storing pattern data required for recognizing the image of the equipment and devices taken by said imaging means;

pattern data recognition means for recognizing the pattern data stored in said third storage means from the image of said equipment and devices taken by said imaging means;

fourth storage means for storing third data indicating the coordinates of the image corresponding to the pattern data stored in said third storage means; and detection means for detecting the first data indicating the coordinates of the image stored in said fourth storage means corresponding to the pattern data recognized by said pattern data recognition means.

* * * * *